United States Patent [19]

Nagata et al.

[11] Patent Number: 5,113,255
[45] Date of Patent: May 12, 1992

[54] MOVING IMAGE SIGNAL ENCODING APPARATUS AND DECODING APPARATUS

[75] Inventors: Atsushi Nagata, Hirakata; Kenichi Takahashi, Kyoto; Nobuyasu Takeguchi, Osaka, all of Japan

[73] Assignee: Matsushita Electric Industrial Co., Ltd., Osaka, Japan

[21] Appl. No.: 522,121

[22] Filed: May 11, 1990

[30] Foreign Application Priority Data

May 11, 1989 [JP] Japan ................... 1-118004
Jun. 26, 1989 [JP] Japan ................... 1-163059
Jun. 29, 1989 [JP] Japan ................... 1-169320

[51] Int. Cl.⁵ .................... H04N 7/133; H04N 7/137
[52] U.S. Cl. .................... 358/136; 358/105; 358/133
[58] Field of Search ............ 358/133, 135, 136, 105

[56] References Cited

U.S. PATENT DOCUMENTS

4,383,272  5/1983  Netravali et al. ............ 358/136
4,727,422  2/1988  Hinman .................... 358/133
4,958,226  9/1990  Haskell .................... 358/136

Primary Examiner—Howard W. Britton
Attorney, Agent, or Firm—Wenderoth, Lind & Ponack

[57] ABSTRACT

A moving image signal encoding apparatus includes: a frame decimating circuit for extracting encoded frames from an input moving image signal at specified intervals; a frame interpolating circuit for obtaining an interpolated frame between the encoded frames, and a circuit for obtaining an error formed by frame interpolation. A moving image signal decoding apparatus includes: a receiving circuit for extracting a frame code from an inputted signal; a frame decoding circuit for decoding the frame code to obtain a reproduced frame, and a frame interpolating circuit for obtaining an interpolated frame between the reproduced frames. By transmitting an error of the interpolated frame from the encoding apparatus to the decoding apparatus and correcting the error of the interpolated frame with the decoding apparatus, the error of the interpolated frame is eliminated. Alternatively, depending on the value of the error of the interpolated frame obtained with the encoding apparatus, a circuit determines the operation mode as to whether the frame interpolating circuit of the decoder carries out frame interpolation or preceding value holding and sends a flag to show the operation mode to the decoder, so that improvement occurs when the error of the interpolated frame is large.

9 Claims, 6 Drawing Sheets

FIG. 8 ent of the present invention;

MOVING IMAGE SIGNAL ENCODING APPARATUS AND DECODING APPARATUS

BACKGROUND OF THE INVENTION

1. Field of the Invention

The present invention relates to a moving image signal encoding apparatus for performing compression encoding of a moving image signal for transmission of the moving image signal or recording of the same on a recording medium and a decoding apparatus for decoding the codes which have been transmitted or reproduced from a recording medium to obtain a reproduced image.

2. Description of Prior Art

Recently, in the moving image signal encoding apparatus and decoding apparatus, in consequence of the developments of television telephones and television conference systems, various compression encoding systems have been in practical use. As a procedure for curtailing the information amount to be used in these encoding systems there is a frame decimation. This is to curtail the information amount by decimating selected frames of the moving image signal in encoding. Since the movements of the reproduced images become unnatural by decimating the frames, frame interpolation is carried out in the decoding apparatus to obtain the reproduced images having smooth movements.

As one of the precedents to carry out frame interpolation with a moving image signal decoding apparatus there is a construction shown in U.S. Pat. No. 4,727,422. Hereinafter, the construction of the conventional moving image signal encoding apparatus and decoding apparatus is described.

The input of the moving image signal encoding apparatus is a moving image signal of 30 frames/sec. The inputted moving image signal, after decimation of the number of frames to $\frac{1}{2}$, becomes a moving image signal of 15 frames/sec. These remaining frames of the moving image signal will be encoded. In the description hereinafter, these frames are called "encoded frames". Interframe motion vectors are obtained from the encoded frames. The motion vectors are obtained on a block by block basis. The motion vectors are used for frame interpolation in the decoding apparatus. The encoded frames and the motion vectors are respectively encoded, after which additional information is incorporated to obtain an output signal of the moving image signal encoding apparatus. The output signal is sent out to a transmission channel or recorded on a recording medium.

The moving image signal decoding apparatus is to decode the signal encoded by the moving image signal encoding apparatus and reproduce the moving image signal. By a signal receiving circuit, each code is received from the transmission channel or read out from the recording medium. The codes are decoded by respective decoding circuits to become the reproduced frames and the motion vectors. The frequency of the reproduced frames is 15 frames/sec. A frame interpolation circuit obtains interpolated frames each positioned between two reproduced frames. The frame interpolation is a motion compensating frame interpolation using a motion vector between the frames. By alternately outputting the interpolated frames and the reproduced frames, an output image signal of 30 frames/sec is obtained.

However, the above construction involves the problem to cause errors to the interpolated frames because there are no correct motion vectors in such cases that: (1) there are objects which move in different directions from each other in a block; (2) the background appears from the shade of a moving object or the background is hidden by a moving object; (3) the moving object changes in shape; and (4) there is a movement accompanied with rotation.

SUMMARY OF THE INVENTION

An object of the present invention is to realize reduction in interpolation errors of frames in a moving image signal encoding apparatus which decimates frames in encoding and a moving image signal decoding apparatus which interpolates frames in decoding.

To achieve this object, a moving image signal encoding apparatus of the present invention comprises a frame decimator for extracting encoded frames from an input moving image signal at specified intervals, a frame encoder for encoding said encoded frames to obtain frame codes; a frame interpolator for producing interpolated frames positioned between said encoded frames from said frame codes; a motion estimator for evaluating errors of said interpolated frames, and a transmitter for transmitting said frame codes and output signals of said error evaluator as an output signal of the moving image signal encoding apparatus.

A moving image signal decoding apparatus of the present invention is to decode the signals transmitted from the aforementioned moving image signal encoding apparatus, and comprises: a receiver for extracting said frame codes and said error evaluator output signals from the input signal; a frame decoder for decoding said frame codes to obtain the reproduced frames, and a frame interpolator for producing interpolated frames positioned between said reproduced frames.

Preferably, said error evaluator includes a means for encoding the errors of said interpolated frames to error codes, and said moving image signal decoding apparatus includes a means for correcting the errors of said interpolated frames according to the error codes to obtain said reproduced frames and error-corrected interpolated frames in a specified sequence.

Alternatively, said error evaluator includes a means for obtaining the errors of said interpolated frames to obtain error codes and a means for producing a mode selection signal from the error codes for changing over an operation mode of the frame interpolator of the moving image signal decoding apparatus, and, in the moving image signal decoding apparatus, the frame interpolator includes a means for selecting whether to perform frame interpolation or to hold a preceding reproduced frame (to repeat the preceding reproduced frame) according to the mode selection signal, and outputting said reproduced frames and said interpolated frames in a specified sequence.

DESCRIPTION OF PREFERRED EMBODIMENTS

Hereinafter, the moving image signal encoding apparatus and decoding apparatus according to the embodiments of the present invention are explained with reference to the drawings.

Figure 1:
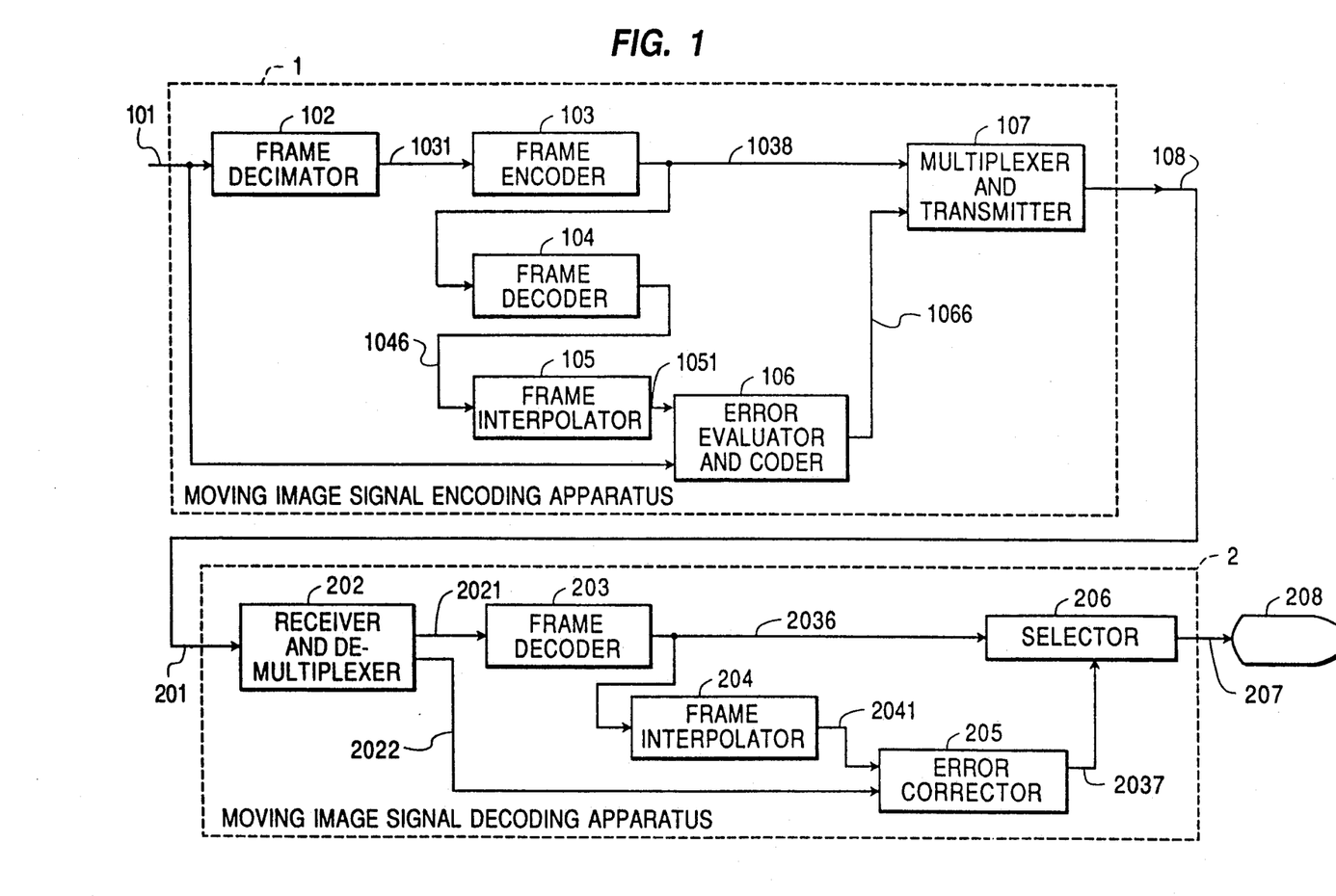
FIG. 1 is a block diagram showing a moving image signal encoding apparatus and a moving image signal decoding apparatus in accordance with a first embodiment of the present invention.

FIG. 1 shows a block diagram of a moving image signal encoding apparatus and a decoding apparatus in accordance with a first embodiment of the present invention. In FIG. 1, the numeral 1 denotes the moving image signal encoding apparatus for encoding and transmitting a moving image signal, in which element 101 is an input moving image signal; element 102 is a frame decimator; 103 is a frame encoder; 104 is a local frame decoder; 105 is a frame interpolator; 106 is an error calculator and coder; 107 is a multiplexer and transmitter, and element 108 is an output signal of the moving image signal encoding apparatus. The numeral 2 denotes the moving image signal decoding apparatus for reproducing the moving image signal, in which element 201 is an input signal of the moving image signal decoding apparatus; element 202 is a receiver and demultiplexer; 203 is a frame decoder; 204 is a frame interpolator; 205 is an error corrector; 206 is a selector, and 207 is an output signal of the moving image signal decoding apparatus.

The operations of the moving image signal-encoding apparatus and decoding apparatus constituted as above are explained by way of FIG. 1.

Figure 2A:
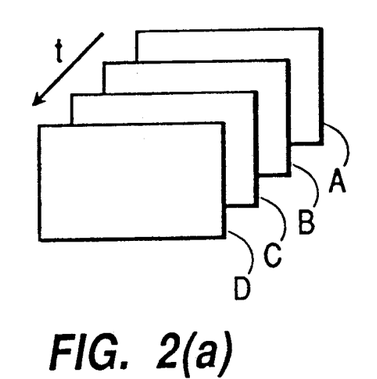
FIGS. 2(a)–2(b) are illustrative view to explain a relation, between frames.
Figure 2B:
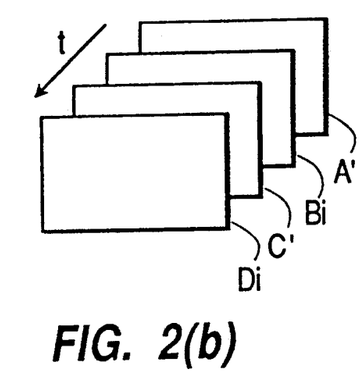

To an input of the moving image signal encoding apparatus, a moving image signal 101 to be encoded is inputted. A frame decimator 102 decimates the frames of the input moving image signal 101 by one-half. This operation is illustrated in FIG. 2 (a). A, B, C, D are the continued frames of the input moving image signal, of which B and D are the frames to be decimated by the frame decimator 102, and A and C are the frames to be inputted to the frame encoder 103. In the following explanation, frames A and C are called the "encoded frames". The frame encoder 103 encodes each encoded frame to a frame code 1038. The frame decoder 104 decodes the frame code to obtain a reproduced frame 1046. The frame interpolator 105 synthesizes interpolated frames 1051 each positioned between two reproduced frames. The relationship between the reproduced frames and the interpolated frames is explained in FIG. 2 (b). A' and C' are the reproduced frames, and these correspond to the encoded frames A and C. The encoded frames A and C are encoded by the frame encoder 103 and then decoded by the frame decoder 104 to be the reproduced frames A' and C'. Bi and Di are the interpolated frames outputted by the frame interpolator 105. The error evaluator and coder 106 encodes an error of each interpolated frame obtained as a difference between the interpolated frame and a corresponding frame of the input moving image signal, and outputs it as an interpolated frame code 1066. The multiplexer and transmitter 107 multiplexes the frame codes and the interpolated frame codes, and outputs the multiplexed result as an output signal 108 of the moving image signal encoding apparatus.

Next, the operations of the moving image signal decoding apparatus 2 are explained. The moving image signal decoding apparatus 2 is to decode the inputted signal 201 and output a reproduced moving image signal. The inputted signal 201 is the output signal 108 of the moving image signal encoding apparatus 1. The receiver and demultiplexer 202 extracts the frame codes 2021 and the interpolated frame codes 2022 from the inputted signal. These codes are respectively equal to the frame codes 1038 and the interpolated frame codes 1066 of the moving image signal encoding apparatus 1. The frame decoder 203 decodes the frame codes and outputs reproduced frames 2036. The frame interpolator 204 synthesizes interpolated frames 2041 each positioned between two reproduced frames. The relationship between the reproduced frames and the interpolated frames is the same as in the case of the moving image signal encoding apparatus 1 as shown in FIG. 2 (b). The error corrector 205 corrects the errors of the interpolated frames by using the interpolated frame codes 2022. The selector 206 alternately selects the reproduced frames 2036 and the error-corrected interpolated frames 2037 to obtain the output signal 207 of the moving image signal encoding apparatus. A display apparatus 208 displays the reproduced image based on the output signal 207 of the moving image signal encoding apparatus 2.

Figure 3:
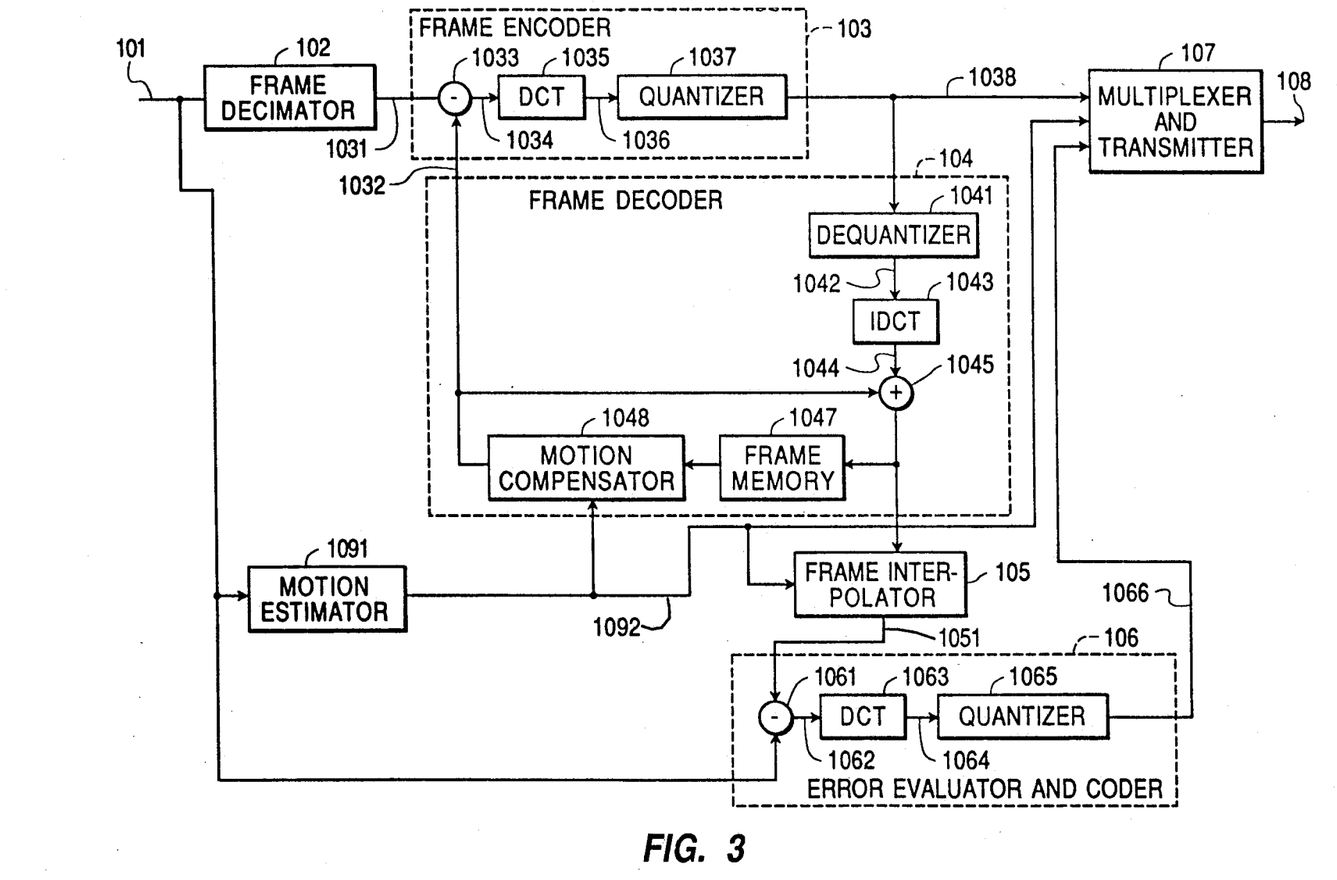
FIG. 3 is a block diagram of a moving image signal encoding apparatus in accordance with a second embodiment of the present invention.

FIG. 3 shows a block diagram of a moving image signal encoding apparatus in accordance with a second embodiment of the present invention. In FIG. 3, element 101 is an input moving image signal; element 102 is a frame decimator; element 103 is a frame encoder; element 1033 is a subtraction circuit; element 1035 is a DCT (discrete cosine transform) operation circuit; element 1037 is a quantizer; element 104 is a local frame decoder; element 1041 is a dequantizer; element 1043 is an inverse DCT (IDCT) operation circuit; element 1045 is an addition circuit; element 1047 is a frame memory; element 1048 is a motion compensator; element 105 is a frame interpolator; element 106 is an error evaluator and coder; element 1061 is a subtraction circuit; element 1063 is a DCT operation circuit, 1065 is a quantizer; element 107 is a multiplexer and transmitter; element 108 is an output signal of the moving image signal encoding apparatus, and element 1091 is a motion estimator.

The operations of the moving image signal encoding apparatus constituted as above are explained by way of FIG. 3.

The motion estimator 1091 estimates the motion of the input moving image signal 101 and outputs a motion vector 1092.

The frame decimator 102 decimates the frames of the input moving image signal by one-half The operation of the frame decimator 102 is the same as that of the first embodiment.

The frame encoder 103 encodes the encoded frames 1031 to frame codes 1038. The encoding method is an interframe coding. The subtraction circuit 1033 obtains a predicted error signal 1034 which is a differential value between the encoded frame 1031 and a predicted frame 1032 formed by the later-described local decoder 104 The DCT operation circuit 1035 transforms the predicted error signal 1034 to a DCT coefficient 1036. The quantizer 1037 quantizes the DCT coefficient 1036 to obtain the frame code 1038.

The local decoder 104 decodes the frame code 1038 to obtain a reproduced frame 1046 and the predicted frame 1032. The dequantizer 1041 dequantizes the frame code 1038 to obtain a reproduced DCT coefficient 1042. The inverse DCT operation circuit 1043 inverse discrete cosine transforms the reproduced DCT coefficient 1042 to obtain a reproduced predicted error signal 1044. The addition circuit 1045 adds the reproduced predicted error signal 1044 and the predicted frame 1032 to obtain the reproduced frame 1046. The frame memory 1047 stores the reproduced frame 1046. The motion compensator 1048 carries out a motion compensation of the reproduced frame read out from the frame memory 1047 according to the motion vector 1092 to obtain the predicted frame 1032.

The frame interpolator 105 synthesizes an interpolated frame 1051 from the motion vector 1092 and the reproduced frame 1046. The relationship between the reproduced frames and the interpolated frames is the same as that explained in the first embodiment.

The error evaluator and coder 106 encodes the error of the interpolated frame 1051 to obtain an interpolated frame code 1066. The subtraction circuit 1061 calculates a differential value between the interpolated frame 1051 and a corresponding frame of the input moving image signal 101 to obtain an interpolated frame error signal 1062. The DCT (Discrete Cosine Transform) operation circuit 1063 transforms the interpolated frame error signal 1062 to a DCT coefficient 1064. The quantizer 1065 quantizes the DCT coefficient 1064 to obtain the interpolated frame code 1066.

The multiplexer and transmitter 107 multiplexes and outputs the frame code 1038, the motion vector 1092, and the interpolated frame code 1066 as the output signal 108 of the moving image signal encoding apparatus.

Figure 4:
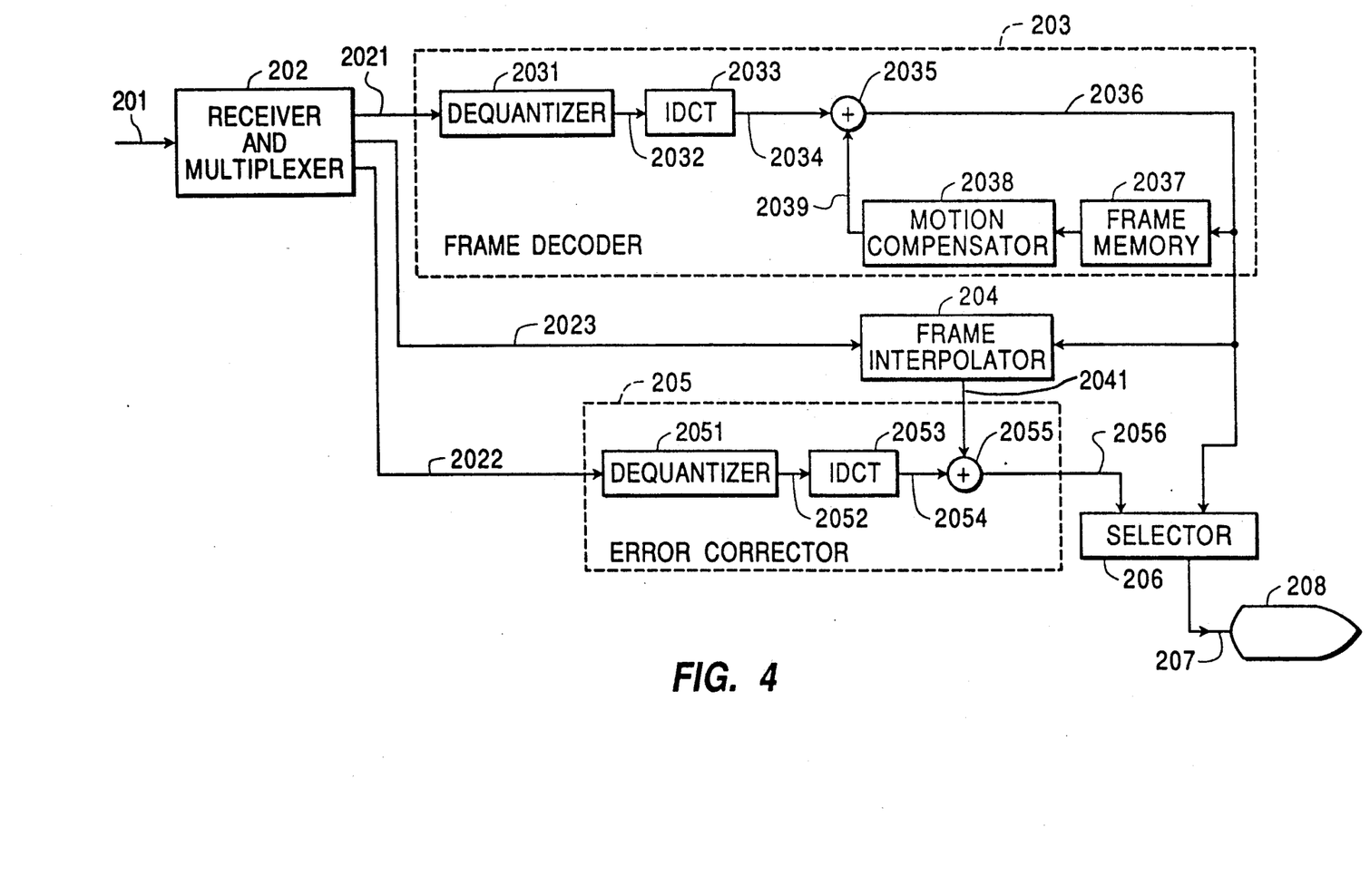
FIG. 4 is a block diagram of a moving image signal decoding apparatus in accordance with the second embodiment of the present invention.

FIG. 4 shows a block diagram of a moving image signal decoding apparatus in accordance with the second embodiment of the present invention. In FIG. 4, element 201 is an input signal of the moving image signal decoding apparatus; element 202 is a receiver and multiplexer; element 203 is a frame decoder; element 2031 is a dequantizer; element 2033 is an inverse DCT operation circuit, 2035 is an addition circuit, 2037 is a frame memory, 2038 is a motion compensator; element 204 is a frame interpolator; element 205 is an error corrector; element 2051 is a dequantizer; element 2053 is an inverse DCT operation circuit; element 2055 is an addition circuit; element 206 is a selector, and element 207 is an output signal of the moving image signal decoding circuit.

The operations of the moving image signal decoding apparatus constituted as above are explained by way of FIG. 4.

The input signal 201 is an output signal of the moving image signal encoding apparatus of FIG. 3. The receiver and demultiplexer 202 extracts a frame code 2021, an interpolated frame code 2022, and a motion vector 2023 from the input signal 201. These codes are equal to the frame code 1038, the interpolated frame code 1066, and the motion vector 1092, respectively, of the moving image signal encoding apparatus in FIG. 3.

The frame decoder 203 decodes the frame code 2021 to obtain a reproduced frame 2036. The dequantizer 2031 dequantizes the frame code 2031 to obtain a reproduced DCT coefficient 2032. The inverse DCT operation circuit 2035 inverse discrete cosine transforms the reproduced DCT coefficient 2032 to obtain a reproduced predicted error signal 2034. The addition circuit 2035 adds the reproduced predicted error signal 2034 and a predicted frame 2039 formed by the later-described motion compensator 2038 and to obtain the reproduced frame 2036. The frame memory 2037 stores the reproduced frame 2036. The motion compensator 2032 carries out a motion compensation of the reproduced frame read out from the frame memory 2037 according to the motion vector 2023 to obtain the predicted frame 2039.

The frame interpolator 204 synthesizes an interpolated frame 2041 from the motion vector 2023 and the reproduced frame 2036. The relationship between the reproduced frame and the interpolated frame is the same as explained in the first embodiment.

The error corrector 205 corrects the error of the interpolated frame 2041 by using the interpolated frame code 2022. The dequantizer 2051 dequantizes the interpolated frame code 2022 to obtain a reproduced DCT coefficient 2052. The inverse DCT operation circuit 2053 inversely discrete cosine transforms the reproduced DCT coefficient 2052 to obtain an interpolated frame error signal 2054. The addition circuit 2055 adds the reproduced interpolated frame error signal 2054 and the interpolated frame 2041 to obtain a reproduced interpolated frame 2056. The selector 206 alternately selects the reproduced frames 2036 and the reproduced interpolated frames 2056 to obtain the output signal 207 of the moving image signal decoding apparatus and supplies the output signal 207 to the display apparatus 208.

Figure 5:
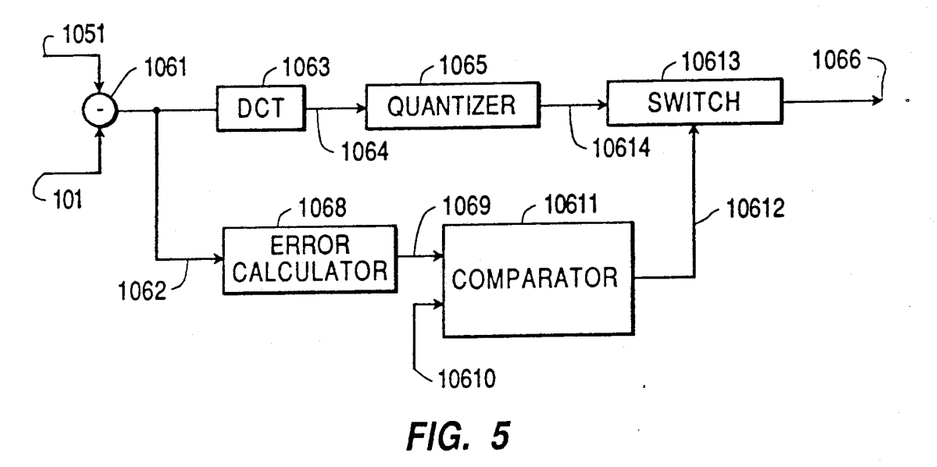
FIG. 5 is a block diagram of an error evaluator and coder of a moving image signal decoding apparatus in accordance with a third embodiment of the present invention.

FIG. 5 shows a block diagram of an error evaluator and coder of a moving image signal encoding apparatus in accordance with a third embodiment of the present invention. The constructions of the other parts are the same as those in the second embodiment shown in FIG. 3. In FIG. 5, element 1051 is an input interpolated frame; element 101 is an input moving image signal of the moving image signal encoding apparatus; element 1061 is a subtraction circuit; element 1063 is a DCT operation circuit; element 1065 is a quantizer; element 1068 is an error calculator; element 10611 is a comparator, element 10610 is a reference level; element 10613 is a switch, and element 1066 is an interpolated frame code.

Figure 6:
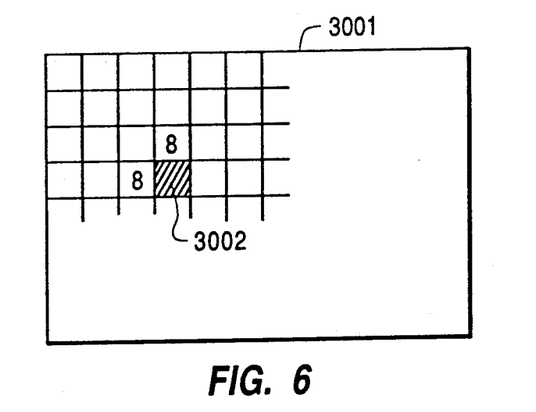
FIG. 6 is a view showing an interpolated frame divided into a plurality of blocks.

The operations of the error evaluator and coder circuit constituted as above are explained by way of FIG. 5. The subtraction circuit 1061 obtains an interpolated frame error signal 1062 which is a differential value between the input interpolated frame 1051 and the input moving image signal 101. The DCT operation circuit 1063 transforms the interpolated frame error signal 1062 to a DCT coefficient 1064. The quantizer 1065 quantizes the DCT coefficient 1064 to obtain a code 10614. The error calculator 1068 obtains the value of the interpolated frame error signal 1062 on a block by block basis to obtain an error value 1069. This block is explained with reference to FIG. 6. In FIG. 6, element 3001 is interpolated frame, and element 3002 is a block in this frame. The interpolated frame is divided at intervals of 8 image elements both vertically and horizontally to obtain each block. The comparator 1061 compares the error value 1069 with a specified reference level 10610, and closes the switch 1061 when the error value 1069 exceeds the reference level 10610. When the switch is closed, the output code 10614 of the quantizer 1065 becomes the interpolated frame code 1066 which is an output of the interpolated frame encoding circuit.

Figure 7:
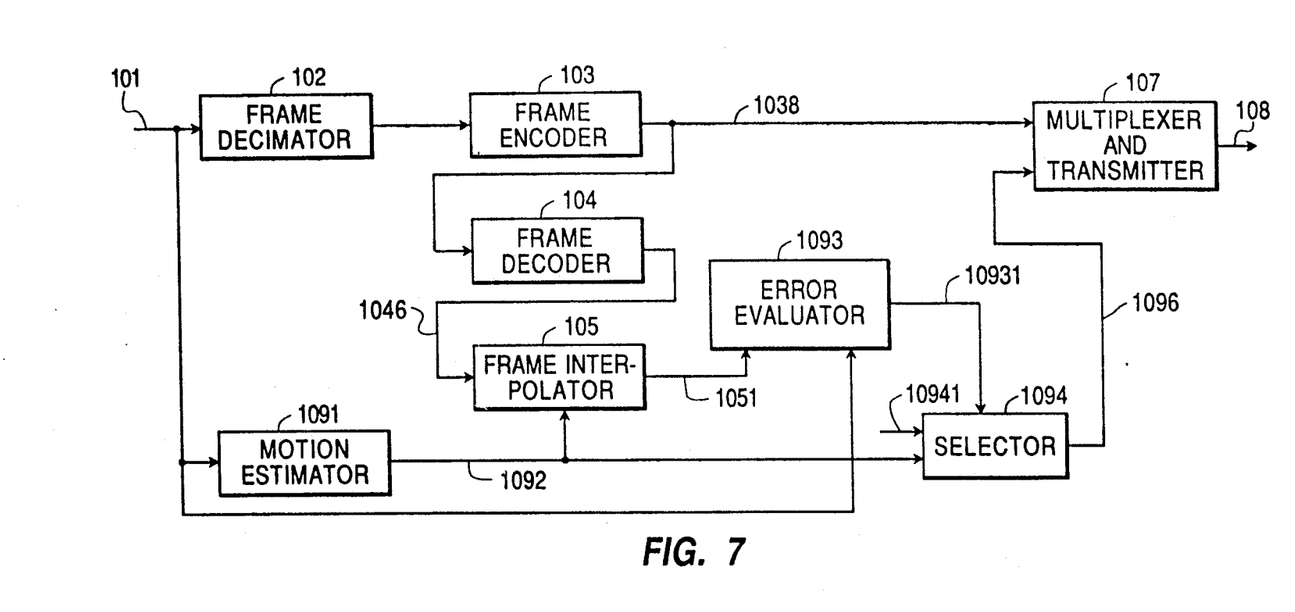
FIG. 7 is a block diagram of a moving image signal encoding apparatus in accordance with a fourth embodiment of the present invention.

FIG. 7 shows a block diagram of a moving image signal encoding apparatus in accordance with a fourth embodiment of the present invention. In FIG. 7, element 101 is an input moving image signal; element 102 is a frame decimator; element 103 is a frame encoder; element 104 is a frame decoder; element 105 is a frame interpolator; element 107 is a transmitter and multiplexer; element 108 is an output signal of the moving image signal encoding apparatus; element 1091 is a motion estimator; element 1093 is an error evaluator, and element 1094 is a selector.

The operations of the moving image signal encoding apparatus constituted as above are explained by way of FIG. 7.

The frame decimator 102 decimates the frames of the input moving image signal 101 by one-half. The operation of the frame decimator 102 is the same as that of the first embodiment.

The frame encoder 103 encodes the encoded frame to obtain the frame code 1038. The frame decoder 104 decodes the encoded frame to obtain the reproduced frame 1046. The frame interpolator 105 produces the interpolated frame 1051 from the motion vector 1092 and the reproduced frame 1046. The relationship between the reproduced frame and the interpolated frame is the same as that explained in the first embodiment.

The error evaluator 1093 obtains the error of the interpolated frame 1051 and outputs a mode selection signal 10931. When the error of the interpolated frame is smaller than a predetermined reference level, the mode selection signal becomes a code indicating a frame interpolation mode. When the error is larger than the reference level, the mode selection signal becomes a code indicating a previous value retaining mode. The selector 1094 outputs as its output 1096 the motion vector 1092 when the mode selection signal indicates the frame interpolation mode, and outputs a flag signal when the mode selection signal indicates the previous value retaining mode.

The multiplexer and transmitter 107 multiplexes and outputs the frame code 1038 and the output 1096 of the selector 1094 as the output signal 108 of the moving image signal encoding apparatus.

Figure 8:
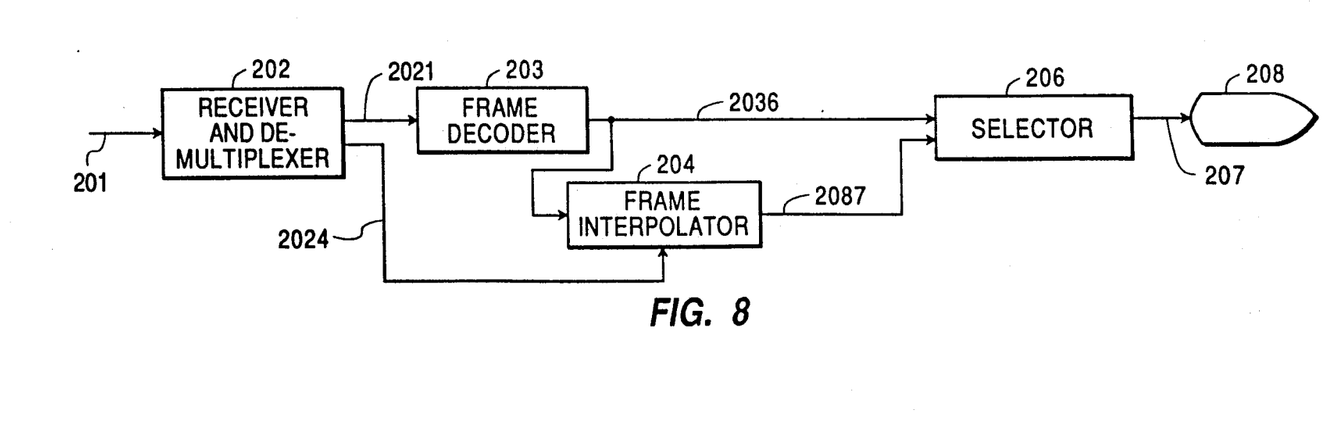
FIG. 8 is a block diagram of a moving image signal decoding apparatus in accordance with the fourth embodiment of the present invention.

FIG. 8 shows a block diagram of the decoding apparatus in accordance with the fourth embodiment of the present invention. In FIG. 8, 201 is an input signal of the moving image signal decoding apparatus, 202 is a receiver and demultiplexer, 203 is a frame decoder, 204 is a frame interpolator, 206 is a selector, and 207 is an output signal of the moving image signal decoding apparatus.

The operations of the moving image signal decoding apparatus constituted as above are explained by way of FIG. 8.

The moving image signal decoding apparatus 2 is to decode the inputted signal 201 and output the moving image signal 207. The inputted signal 201 is the output signal 108 of the moving image signal encoding apparatus of FIG. 6. The receiver and demultiplexer 202 extracts from the inputted signal 201 a frame code 2021 and a signal 2024 which is the motion vector or the flag signal.

Figure 9A:
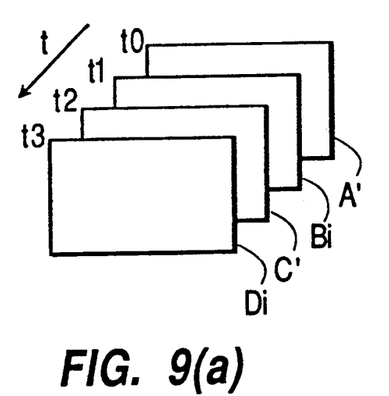
FIGS. 9(a)-9(b) are views showing a relationship between frames in accordance with the fourth embodiment of the present invention.

When the motion vector is extracted from the receiver and demultiplexer 202, the operation sequence is as follows. The frame decoder 203 decodes the frame code 2021 to obtain the reproduced frame 2036. The frame interpolator 204 interpolates a frame between the reproduced frames. The selector 206 alternately selects the reproduced frames 2036 and the interpolated frames 2087 to obtain the output signal 207 of the moving image signal decoding apparatus. In FIG. 9 (a) the output signal of the moving image signal decoding apparatus is shown, in which A' and C' are the reproduced frames, and Bi' and Di' are the interpolated frames.

Figure 9B:
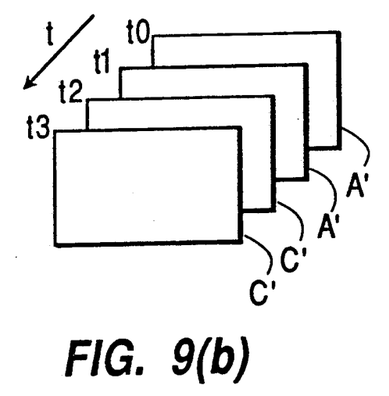

Further, when the flag signal is extracted as the output 2024 of the receiver and demultiplexer 202, the operation sequence is as follows. The frame decoder 203 decodes the frame code 2021 to obtain the reproduced frame 2036. The frame interpolator 204 obtains the frame positioned between the reproduced frames by holding the preceding frame. The held previous reproduced frame is outputted as the output frame 2087. This operation is shown in FIG. 9 (b). The frames A' and C' at the time t0 and t2 are the reproduced frames, and the frames A' and C' at the time t1 and t3 are those in which the frames A' and C' at the time t0 and t2 are respectively held for 1 frame period of time, i.e; the reproduced frames A' and C' are repeated. The selector 206 alternately selects the reproduced frames 2036 and the output frames 2087 of the from interpolator 204 to obtain the output signal 207 of the moving image signal decoding apparatus. The output signal 207 is displayed as a reproduced image by the display apparatus 208.

What is claimed is:

1. A moving image signal encoding apparatus comprising: a frame decimator for extracting the encoded frames from an input moving image signal at specified intervals; a frame encoder for encoding said encoded frames to obtain frame codes; a frame interpolator for producing interpolated frames positioned between said encoded frames from said frame codes; an error evaluator for evaluating errors of said interpolated frames, and a transmitter for transmitting said frame codes and output signals of said error evaluator as an output of the moving image signal encoding apparatus.

2. A moving image signal encoding apparatus comprising; a frame decimator for extracting encoded frames to obtain frame codes; a decoder for decoding said frame codes to obtain reproduced frames; a frame interpolator for producing interpolated frames positioned between said reproduced frames; and interpolated frame encoder for encoding errors of said interpolated frames to obtain interpolated frame codes, and a transmitter for transmitting said frame codes and said interpolated frame codes.

3. A moving image signal encoding apparatus according to claim 2, wherein said decoder includes a means for decoding the frame code to obtain a reproduced frame, and a means for obtaining a predicted frame, and said encoder comprises a subtractor for obtaining a predicted error signal from said encoded frame and said predicted frame, and a predicted error encoder for encoding said predicted error signal to obtain a frame code.

4. A moving image signal encoding apparatus according to claim 2, wherein said interpolated frame encoder includes a subtractor for obtaining a difference between said interpolated frame and a corresponding frame of said input moving image signal, and an error encoder for encoding said difference to obtain an interpolated frame code.

5. A moving image signal encoding apparatus according to claim 2, wherein said interpolated frame encoder includes: a subtractor for obtaining a difference between said interpolated frame and a corresponding frame of said input moving image signal; an error calculator for obtaining a value of said difference; an encoded area selector for determining an area for encoding said difference by an output of said error calculator, and an encoder for encoding said difference by using an output of said encoded area selector to obtain an interpolated frame code.

6. A moving image signal encoding apparatus according to claim 2, further comprising a motion estimator for detecting a motion vector of the input moving image signal, wherein said decoder includes a means for decoding the frame code to obtain a reproduced frame, and a means for motion compensating said reproduced frame by said motion vector to obtain a predicted frame, and said encoder includes a subtractor for obtaining a predicted error signal from said encoded frame and said predicted frame, and a predicted error encoder for encoding said predicted error to obtain a frame code.

7. A moving image signal decoding apparatus for decoding a signal produced by a moving image signal encoding apparatus comprising: a frame decimator for extracting encoded frames from an input moving image signal at specified intervals; a frame encoder for encoding said encoded frames to obtain frame codes; a decoder for decoding said frame codes to obtain reproduced frames, a frame interpolator for producing interpolated frames positioned between said reproduced frames; an interpolated frame encoder for encoding errors of said interpolated frames to obtain interpolated frame codes, and a transmitter for transmitting said frame codes and said interpolated frame codes; said decoding apparatus comprising: a receiver for extracting said frame code and said interpolated frame code from an input signal; a decoder for decoding said frame code to obtain the reproduced frame; a frame interpolator for producing the interpolated frame positioned between said reproduced frames; an error corrector for correcting an error of said interpolated frame, and a means for producing a moving image signal from said reproduced frame and an output of said error corrector.

8. A moving image signal encoding apparatus comprising: a frame decimator for extracting encoded frames from an input moving image signal at specified intervals; a motion estimator for obtaining motion vectors between said encoded frames; a frame encoder for encoding said encoded frames to obtain frame codes; a frame interpolator for producing interpolated frames positioned between said encoded frames from said frame codes; a error calculator for obtaining errors of said interpolated frames; a selector for selecting whether to output said motor vectors or to output a flag to indicate not to output said motion vectors by using the errors obtained by said error calculator, and a means for outputting said frame codes and an output of said selector.

9. A moving image signal decoding apparatus for decoding the signal produced by a moving image signal encoding apparatus comprising: a frame decimator for extracting encoded frames from an input moving image signal at specified intervals; a motion estimator for obtaining motion vectors between said encoded frames; a frame encoder for encoding said encoded frames to obtain frame codes; a frame interpolator for producing interpolated frames positioned between said encoded frames from said frame codes; an error calculator for obtaining errors of said interpolated frames; a selector for selecting whether to output said motion vectors or the output a flag to indicate not to output said motion vectors by using the errors obtained by said error calculator, and a means for outputting said frame codes and an output of said selector; said decoding apparatus comprising: a receiver for extracting the frame codes and said interpolated frame codes from an inputted signal; a frame decoder for decoding said frame codes to obtain reproduced frames, and a frame interpolator for producing interpolated frames positioned between said reproduced frames or holding a preceding reproduced frame, wherein, when said receiver outputs a motion vector, said frame interpolator produces an interpolated frame, and when said receiver receives a flag, said frame interpolator holds the preceding reproduced frame.

* * * * *